(12) United States Patent
Ardaud et al.

(10) Patent No.: US 6,627,725 B2
(45) Date of Patent: *Sep. 30, 2003

(54) COMPOSITION WHICH IS USEFUL FOR OBTAINING A MATT OR SATIN COATING, USE OF THIS COMPOSITION AND COATING THUS OBTAINED

(75) Inventors: Pierre Ardaud, Sainte-Foy-les-Lyon (FR); Francis John Williams, Llinars del Valles (ES); Jean-Marie Bernard, Mornant (FR); Bernard Vogin, Chaponost (FR)

(73) Assignees: Rhodia Chimie, Courbevoie Cedex (FR); Resinas Sinteticas S. A., Saint-Celoni (ES)

( * ) Notice: Subject to any disclaimer, the term of this patent is extended or adjusted under 35 U.S.C. 154(b) by 0 days.

This patent is subject to a terminal disclaimer.

(21) Appl. No.: 09/917,827

(22) Filed: Jul. 31, 2001

(65) Prior Publication Data

US 2002/0037989 A1 Mar. 28, 2002

Related U.S. Application Data

(63) Continuation of application No. 09/240,598, filed on Feb. 1, 1999, now Pat. No. 6,291,624, which is a continuation-in-part of application No. PCT/FR97/01421, filed on Jul. 30, 1997, and a continuation-in-part of application No. PCT/FR98/01681, filed on Jul. 29, 1998.

(30) Foreign Application Priority Data

Jul. 30, 1996 (EP) .............................................. 96401703
Jul. 30, 1997 (FR) .............................................. 97 09724
Jan. 30, 1998 (FR) .............................................. 98 01270

(51) Int. Cl.$^7$ ............................................... C08G 18/80
(52) U.S. Cl. ............................ 528/45; 528/53; 528/54; 528/58; 525/440
(58) Field of Search ............................. 528/45, 53, 54, 528/58; 525/440

(56) References Cited

U.S. PATENT DOCUMENTS

| 3,317,463 | A | 5/1967 | Schonfeld |
| 3,991,034 | A | 11/1976 | Takeo et al. |
| 4,151,220 | A | 4/1979 | Watanabe |
| 4,252,923 | A | 2/1981 | König et al. |
| 4,375,539 | A | 3/1983 | McBride et al. |
| 4,412,034 | A | 10/1983 | Meyer et al. |
| 4,528,355 | A | 7/1985 | Gras et al. |
| 5,538,759 | A | 7/1996 | Hoppe et al. |

FOREIGN PATENT DOCUMENTS

| DE | 3232463 | 3/1984 |
| DE | 3 332 463 | 5/1984 |
| DE | 33 28 131 | 2/1985 |
| DE | 44 30 399 | 2/1996 |
| EP | 0 009 694 | 9/1979 |
| EP | 680984 | * 11/1995 |
| FR | 2 266 725 | 4/1975 |

OTHER PUBLICATIONS

International Search Report for PCT/FR98/01681; Sep., 1999.
International Search Report for PCT/FR97/01421; Jul. 1998.
International Preliminary Examination Report issued in Application No. PCT/FR97/01421; Feb. 1998.
International Preliminary Examination Report issued in Application No. PCT/FR98/01681; Nov. 1997.

* cited by examiner

Primary Examiner—Rachel Gorr
(74) Attorney, Agent, or Firm—Burns, Doane, Swecker & Mathis, L.L.P.

(57) ABSTRACT

The present invention relates to a composition, particularly useful in paint. This composition is defined in that it contains, for successive or simultaneous addition:

an isocyanate which is at least partially masked, having a glass transition temperature (sometimes denoted by the abbreviation Tg) of at least 20° C., advantageously of at least 40° C., and a degree of liberation at 120° C. of not more than 5%;

a polyol having the following characteristics:
   a glass transition temperature (sometimes denoted by the abbreviation Tg) which is at least equal to about 40° C., advantageously at least equal to about 50° C.;
   a hydroxyl number at least equal to about 10 mg/g, advantageously at least equal to about 15 mg/g;
   an average molecular mass Mn at least equal to about 1000 g/mol and advantageously to 2000 g/mol.

13 Claims, No Drawings

COMPOSITION WHICH IS USEFUL FOR OBTAINING A MATT OR SATIN COATING, USE OF THIS COMPOSITION AND COATING THUS OBTAINED

This application is a continuation of application Ser. No. 09/240,598, filed Feb. 1, 1999, now U.S. Pat. No. 6,291,624 which is a continuation-in-part of International Application No. PCT/FR97/01421, filed Jul. 30, 1997, and International Application No. PCT/FR98/01681. filed on Jul. 29, 1998, both of which designate the United States.

The present invention relates to a novel family of compositions containing masked isocyanates and polyols. The invention relates more particularly to powders, including mixtures of powders, and to their use as powder in coatings.

For reasons associated with protection of the environment and safety at work, it is increasingly sought to eliminate the use of solvents in coating techniques and particularly paint. More particularly, reducing VOCs (Volatile Organic Compounds) is an increasingly current preoccupation in the paint and varnish industry. With this aim, the development of products with higher solids content makes it possible to decrease the amounts of solvents required to achieve the application viscosity, and thus to reduce the solvents evaporated during drying of paint film.

Another alternative is to use products in aqueous phase in which the water has replaced the organic solvents as the agent carrying the organic binder. However, a small amount of organic solvent is required to use and form the film of paint. Furthermore, they give rise to water-soluble residues which may be tricky and expensive to process.

In this context, coating techniques using powders are increasingly being developed. A few details of this technique should be given herein in order to gain a better understanding of the present invention. The technique uses a very finely powdered material for which air acts as a vector.

In general, an electrostatic charge of several kilovolts applied between a gun and the article to be painted allows the coating precursor powder, which will be sprayed by the applicator gun, to be attracted and retained.

Firing of the article between 150 and 200° C. allows melting, spreading and then crosslinking of the paint powder (paint being considered the ultimate example for coatings) in order to obtain a uniform and homogeneous layer of the coating.

This technique is non-polluting and has an application yield of close to 100% by virtue of the possibility of recycling the unused powder.

Among the families of products which may be used in this field, mention should be made of those which are the subject of the following summary:

The majority of the market is occupied by so-called "epoxy-polyester hybrid" powder paints, followed by polyesters and polyurethanes, and then so-called "epoxy" powders.

In order to obtain good quality strength on exteriors (in particular with respect to UV radiation and moisture), it is essential to use coatings based on TGIC-polyester or polyurethane which, alone, make it possible to achieve the required levels of performance.

The coating powders may be in several finishes (surface aspect, color, sheen, etc.).

The technique used to achieve these effects is different for conventional liquid paints and powder paints.

When it is desired to modify the sheen, the addition of fillers such as silicas, carbonates of calcium or barytas makes it possible to reduce the sheen in a range from 50 to 90%, but matt finishes cannot be obtained.

In the present invention, a hardened, smooth or structured coating which, when applied to a metal support, has a coefficient of reflection which is at most equal to about 50% at a 60° angle of incidence is defined as a matt or satin system.

However, the systems which are the most difficult to obtain correspond to coatings which are quite clearly matt, that is to say having a sheen of less than about 30% for a 60° angle of incidence or less than about 40% at an 85° angle of incidence.

One of the techniques most commonly used in order to obtain matt finishes comprises combining compounds with very different reactivities.

This is achieved by mixing paint powders having short and long gel times. In this way, microscopic heterogeneity will be obtained at the surface of the coating, thus creating the desired matt effect.

Other techniques make it possible to reduce the sheen of paints. They comprise using additives or waxes but, on the one hand, they are not sufficient by themselves and, on the other hand, when they are used alone, they generally have reproducibility problems and/or mechanical properties that are really quite insufficient, and/or do not allow them to be used externally due to their yellowing or the deterioration of the film due to bad weather.

The system most commonly used externally is that known under the name dry-blend, according to which low sheen is obtained by blending extruded and ground powder paints which each have a very different reactivity. Besides the fact that this system is time-consuming and that it involves the manufacture (extrusion, grinding, blending) of several paints, it exhibits a reduced uniformity of the degree of sheen desired, thereby requiring more steps than usual and involving additional cost.

The compounds obtained from the crosslinking reactions should also not be harmful either to human or animal health or to the environment.

For further details regarding the techniques of powder painting, reference may be made to the following books:

P. Grandou and P. Pastour: Peintures et Vernis [Paints and Varnishes]:
 I les constituents
 II techniques et industries [techniques and industries];
  published by Hermann;
R. Lambourne: Paints and Surface Coatings, theory and practice; published by Halsted Press;
Powder Coating. The Complete Finisher Hand Book; the Powder Coating Institute;
Myers and Long:
 Treatise on Coatings, 5 volumes;
 published by Marcel Dekker.

Accordingly, one of the aims of the present invention is to provide a composition which makes it possible to obtain coatings by the so-called powder technique.

One of the aims of the present invention is to provide a composition which makes it possible to obtain coatings with good resistance to bad weather.

Another aim of the present invention is to provide a composition which makes it possible to obtain matt and/or satin coatings.

Yet another aim of the present invention is to provide a composition of the above type which is easy to use.

These aims and others which will appear hereinbelow are achieved by means of a composition which contains, for successive or simultaneous addition:

an isocyanate which is at least partially masked, having a glass transition temperature (sometimes denoted by the abbreviation Tg) of at least about 20° C., advantageously of at least 40° C., and a degree of liberation (with respect to the masking agent) at 120° C. of not more than 5%;

a polyol having the following characteristics:
  a glass transition temperature (sometimes denoted by the abbreviation Tg) which is at least equal to about 40° C., advantageously at least equal to about 50° C.;
  a hydroxyl number at least equal to about 10 mg/g, advantageously at least equal to about 15 mg/g;
  an average molecular mass Mn at least equal to about 1000 g/mol and advantageously to 2000 g/mol.

In the present description, the term "about" is used to emphasize the fact that the value is rounded up and that, when the figure(s) furthest to the right of a number are zeros, these zeros are positional zeros and not significant figures unless, of course, otherwise stated.

This composition already had a major advantage over the prior art:
  the above aims and others which will become apparent hereinbelow by means of a composition, in particular of the above type, which also contains at least one, advantageously two, and preferably three of the following characteristics:
    the presence of a carboxylic function, in particular in the form of a mixed masked isocyanate (see below);
    the presence of a solid esterification catalyst (see below);
    a matt-effect wax (see below).

The carboxylic function is advantageously in intimate mixture with the isocyanate component of the composition. It is even desirable for the carboxylic function to be grafted onto the isocyanate system via an agent bearing both a reactive function (i.e., having a so-called labile hydrogen) with the isocyanate function and a carboxylic function (COOH in salt form or, advantageously, in free form). It is highly desirable for this agent bearing a carboxylic function to be a masking agent.

It is preferable for the masking group to bear the labile hydrogen which reacts with the isocyanate function via an oxygen in order to give the sequence —NH—CO—O— (i.e., R—NCO+HO—→R—NH—CO—O—).

According to the present invention, the isocyanate is advantageously masked with at least one masking group bearing at least one ester function derived from acid functions and especially acid and ester functions. The masking may be mixed and may involve several masking groups.

In the structure of the isocyanate(s), it is desirable, especially for the matt effect, for the part of the skeleton connecting two isocyanate functions to contain at least one polymethylene chain $(CH_2)$ $\pi$ where $\pi$ represents an integer from 2 to 10, advantageously from 4 to 8. This preference acts on the matt effect and on the mechanical performance levels. When there are several chains, they may be similar or different. In addition, it is desirable for at least one and preferably all of these chains to be free to rotate and thus be exocyclic.

The degree of liberation is quantified by the octanol test (see below).

According to the present invention, the masked isocyanate, pure or as a mixture, is derived from a polyisocyanate, that is to say a compound having at least two isocyanate functions, advantageously more than two (possibility of fractional values since it is generally a mixture of more or less condensed oligomers), this polyisocyanate itself usually being derived from a precondensation or a prepolymerization of unitary diisocyanate (occasionally referred to in the present description as "monomer").

In general, the average molecular mass of these prepolymers or of these precondensates is at most equal to 2000 (one significant figure), more commonly to 1000 (one significant figure, preferably two).

Thus, among the polyisocyanates used for the invention, mention may be made of those of the biuret type and those whose di- or trimerization reaction has led to four-, five- or six-membered rings. Among the six-membered rings, mention may be made of the isocyanuric rings obtained from a homo- or a hetero-trimerization of various diisocyanates alone, with other isocyanate(s) [mono-, di-or polyisocyanate(s)] or with carbon dioxide, in which case a nitrogen of the isocyanuric ring is replaced by an oxygen. Oligomers containing isocyanuric rings are preferred.

The preferred polyisocyanates are those which have at least one aliphatic isocyanate function. In other words, at least one isocyanate function masked according to the invention is connected to the skeleton via an $sp^3$-type carbon advantageously bearing a hydrogen atom, preferably two. It is desirable for the $sp^3$-type carbon itself to be borne by an $sp^3$-type carbon and advantageously carry one, preferably two, hydrogen atoms, in order to prevent the isocyanate function considered from being in a neopentyl position. In other words, it is recommended to choose as the monomer (which, in general, bear two isocyanate functions) at least one compound which bears at least one aliphatic function which is neither secondary nor tertiary nor neopentyl.

In the case of the mixture obtained from several (in general two) types of monomers, it is preferable for this or these monomers, which satisfy the above conditions and/or (advantageously "and") the condition regarding the presence of a polymethylene chain $(CH_2)$ $\pi$, to represent at least ⅓, advantageously ½, preferably ⅔ of the masked isocyanate functions. Thus, in the course of the study according to the present invention, excellent results were obtained with mixtures containing two-thirds HMDT (hexamethylene diisocyanate "trimer") with IPDI or IPDT (IPDI "trimer"), the two being masked according to the invention (nBDI, norbornane diisocyanate, and its trimer are similar).

Obviously, the case in which all of the isocyanates are aliphatic and moreover satisfy the above criterion is preferred.

The agents leading to the masking groups characteristic of the invention are advantageously selected from those which are obtained from the condensation of an aromatic derivative hydroxylated on the ring and bearing a function chosen from nitrile and, preferably, carbonyl functions with an isocyanate. It goes without saying that the condensation takes place on the phenol function.

Among the members of that family, it is convenient to choose those for which an apparent melting point may be determined, this measurement being carried out at room temperature (20° C.). This melting point should be at least equal to 30° C. (one significant figure), advantageously to 50° C.

It is preferable to choose from among those of formula (I):

$$Ar(R)_n(Y-Z)_m(OH)_p \qquad (I)$$

where Ar is an aromatic residue on which are grafted n substituents R, m polar functions Z chosen from nitriles and carbonyl groups, and p hydroxyl functions.

Values of n, m and p are such that the sum n+m+p is at most equal to the number of substitutable chain members; p is advantageously at most equal to 2 and is preferably equal to 1.

Advantageously, m is at most equal to two and is preferably equal to 1.

Advantageously, n is at most equal to 3, preferably chosen from zero, one and two, more preferably equal to zero.

R represents substituents that are inert towards the masking reaction and, in general, corresponds to hydrocarbon chains, usually alkyl chains in the etymological sense of the term, namely an alcohol whose hydroxyl function has been removed.

Two vicinal substituents R may be connected together to form a ring which may, for example, be aromatic.

Z is advantageously chosen from groups having a carbonyl function. Among these functions, mention should be made of alkoxycarbonyl functions (or, in other words, ester functions), the amide function, the ketone function with the preferred condition that there are no acidic hydrogens [in other words the function advantageously does not bear hydrogen or, if it does, the corresponding pKa is at least equal to about 20 (one significant figure, preferably two) and more preferably at least equal to about 25] α to the carbonyl function (ester, ketone or amide). Thus, the preferred amides (including lactam or even urea) are advantageously substituted, preferably, sufficiently for there to be no hydrogens on the nitrogen of the amide function or such that there are no reactive hydrogens.

where Y is chosen from divalent groups, advantageously —O—, —S—, —NR— and —CR'R"— with R' and R" chosen from hydrocarbon radicals, advantageously alkyls, of 1 to 6 carbon atoms, advantageously of 1 to 4 carbon atoms, preferably methyl, more preferably hydrogen; and preferably Y represents a single bond.

It is preferable for the polar function(s) Z (generally chosen from the nitrile function and/or the carbonyl functions) not to be vicinal to the group Z as, for example, in salicylic acid.

The aromatic residue Ar comprises one or more hetero- or homocyclic, advantageously fused rings. It is preferable for Ar not to contain more than two rings and preferably not more than one ring.

The aromatic residue Ar may consist of one or more heterocyclic or homocyclic rings, usually homocyclic on account of their ease of access. The value of six-membered heterocycles, which have a liberation temperature very much lower than that of the corresponding homocycles, should, however, be pointed out.

It is desirable for the total number of carbons in the aromatic derivative hydroxylated on the ring to be at most equal to 20, preferably equal to 10 (one significant figure).

This ring is advantageously six-membered, the ring units consisting of carbon or nitrogen with the number of substituents required for the valency of these atoms.

Among the acids and derivatives, especially esters, which give the most satisfactory results, mention should be made of acids grafted onto a benzene ring or onto pyridine rings. Thus, meta-hydroxybenzoic acid and, especially, para-hydroxybenzoic acid, and their derivatives, give good results.

As has been mentioned above, it is possible to provide several groups (preferably two for economic reasons) masking the isocyanate functions. This diversity may be achieved by mixing various masked (in general with only one masking group) compounds or preferably by coreaction. These masking groups may all be as defined above or only some of them may correspond to this definition. In the latter case, it is preferable for those (that is to say the sum of those) which bear a carbonyl (ester or acid) function advantageously to correspond to the above formula (I) and to correspond to at least about 10% (expressed as blocked isocyanate function), advantageously to about 20%, preferably to $1/3$.

The presence of a carboxylic acid function (—COOH) and in particular of a carboxylic acid function grafted directly onto an aromatic ring, preferably a benzene ring, makes it possible, on the one hand, to increase the melting point of the blocked isocyanate and, on the other hand, to increase significantly the matt effect of the coating after crosslinking (for example the final paint). However, it is preferable, in order to retain the excellent mechanical properties of the system according to the present invention, for the amount of acid function present (in terms of equivalents) to be at most equal to about $9/10$, advantageously to about $4/5$, preferably to $2/3$, more preferably one-third of the isocyanate functions. When the carboxylic functions are borne by agents which are not released under the cooking conditions, in order to preserve the crosslinking-power, it is desirable for the amount of acid borne by the agents which are not released to be not more than ½, advantageously ⅓, of the total amount of isocyanate functions (free, masked, associated with an unreleasable masking agent [cf., aminocaproic acid of the examples]).

The beneficial effects of the acid functions on the matt effect and on the glass transition temperature (Tg) already become apparent from 5% and are very clear from about 10%, but it is desirable to reach a proportion of at least 20% to obtain an effect which is close to inflexion of the curve. In addition, at this concentration level and beyond, the acid functions facilitate the appearance of irregularities which give a so-called "structured" appearance. The melting point and the glass transition temperature (Tg) continually overlap with the acid content up to 100%.

In the case involving an ester/acid couple, and in particular in the case involving an alkyl hydroxybenzoate/hydroxybenzoic acid couple, a good compromise between the matt effect and the various usual properties is already obtained in the region of a $9/10$ molar ratio; i.e., about $9/10$ of ester and about $1/10$ of acid. The presence of the acid functions to a level of about $1/10$, in particular carboxylic, allows good catalysis of the crosslinking.

The effects outlined above for the isocyanate compounds masked with two or more masking agents can be obtained either with a mixture of two or more isocyanates masked with a single masking agent or with isocyanates masked simultaneously or successively with two or more masking agents. The latter case gives better results correlated to the existence of so-called mixed molecules, i.e., molecules for which at least one of the isocyanate functions is masked with a group bearing an acid function and in which at least one of the other isocyanate functions is masked with a group not bearing an acid function. The positive effects of the presence of these so-called mixed molecules are experienced once they correspond to (i.e., once they bear) about 5% of the isocyanate functions, advantageously 10%.

Thus, one of the most advantageous of the uses of the present invention comprises using isocyanates which are at least partially masked by a compound bearing an acid function, advantageously by a compound of formula I where Z is an acid function. It is recommended that the isocyanate then be masked by a group other than that bearing the acid function, and that the acid function of the masking system be between 90 and 10% (expressed as blocked isocyanate function), the other masking agent or agents may be either masking agents which are known per se (which satisfy the liberation temperature and the unmasking constraints specified in the present description), or an ester corresponding to formula I. The latter alternative form is preferred. For the synthesis of these compounds, reference may be made to the general procedures of patent application No. EP 0 680 984

A which gives good results for the operation of (optionally partial) masking by a compound of formula I.

It may be recalled here that the masking agents most commonly used are those mentioned by M. Wicks in his article "Blocked Isocyanates," *Process in Organic Coatings* (1975), Vol. 3, p. 731—their deblocking temperature is advantageously greater than 90° C.

The masking agents can be divided into three groups:
- those in which the labile hydrogen is borne by a chalcogen;
- those in which the labile hydrogen is borne by nitrogen;
- those in which the labile hydrogen is borne by carbon.

Among those in which the labile hydrogen is borne by a chalcogen (preferably a light chalcogen, i.e., sulphur and oxygen), the ones used are especially those in which the chalcogen is an oxygen; among the latter, mention may be made in particular of:
- products containing an >N—OH sequence, such as, for example, oximes (=N—OH) or hydroxyimides ([—CO—]2N—OH); and
- phenols (in the strict sense), especially those in which the aromatic ring is electron-poor, such as the hydroxybenzoates described by the present invention;
- mention may also be made of the compounds described in application EP-A-661,278.

Among those in which the labile hydrogen is borne by a nitrogen, mention may be made in particular of:
- monosubstituted amides, and in particular lactams (the one most frequently used is caprolactam); imides ([—CO—]2N—H), especially cyclic imides such as succinimide;
- unsaturated nitrogenous heterocycles which are, in particular, 5-membered (advantageously diunsaturated), preferably containing at least two hetero atoms (preferably nitrogen); among the latter, mention may be made of diazoles (such as glyoxalines and pyrazoles), triazoles or even tetrazoles;
- mention may also be made of the compounds described in application EP-A-661,278.

The masking agents in which the labile hydrogen is borne by carbon are essentially compounds of malonic nature, i.e., a radical RCH<bearing two electron-withdrawing groups (such as carbonyl, nitrile, Rf or perfluoroalkyl).

The above masking agents (alone or as a mixture) can be used to carry out the present invention provided that the following two conditions are satisfied:
- they are combined with an agent (advantageously a masking agent) bearing carboxylic functions) and a reactive function (which can advantageously be released on cooking) with the isocyanate functions (with the preferences indicated in the present description);
- the compounds obtained from the reaction between the isocyanate, on the one hand, and the masking agent and the agent bearing carboxylic functions), on the other hand, has the required glass transition temperature (Tg) (and melting point).

One of the advantages of using carboxylic groups according to the present invention lies in the fact that it allows masking groups to be used which, in the absence of carboxylic group, would not have a sufficient melting point or glass transition temperature (Tg) for use in powder application. This is the case in particular for triazoles, which, when they are unsubstituted (each of the isomers alone or as a mixture in any proportion of the isomers), are particularly cost-effective.

When only one masking agent is used, it is desirable for this to be a compound according to formula I where Z is ester, with the preferences indicated in patent application No. EP 0 680 984 A, page 2, lines 41 to 50.

As has already been mentioned according to the present invention, it is preferable for the melting point of the compound or of the mixture of compounds obtained to have an apparent melting point which is at least equal to 30° C., preferably 50° C.

It is also preferable for the glass transition temperature to be at least equal to 20° C., advantageously to 40° C.

It is preferable to choose the compounds according to the present invention such that they react completely with a primary alcohol at 250° C. in less than half an hour.

The reaction is considered to be complete if it proceeds to 90% or more.

As has been mentioned above, the isocyanates for which the invention is most advantageous are those whose nitrogen atom is linked to a carbon of $sp^3$ hybridization, and more particularly aliphatic isocyanates, and especially polymethylene diisocyanates (for example TMDI tetramethylene diisocyanate and HMDI [hexamethylene diisocyanate= $OCN—(CH_2)_6—NCO$]) and their various condensation derivatives (biuret and the like) and di- and trimerization derivatives (in the field under consideration the term trimer refers to mixtures derived from the formation of isocyanuric rings from three isocyanate functions; in fact, along with the actual trimer, there are heavier products derived from the trimerization).

According to the present invention, it is desirable and sometimes necessary for the percentage of residual free isocyanate function to be at most equal to 5%, advantageously to 3%, preferably to 1%. The highest melting points or glass transition temperatures are obtained with percentages not exceeding 0.5%. The contents of aromatic derivative hydroxylated on the ring are also advantageously low, that is to say at most equal to 5%, advantageously to 3%, preferably to 1%.

On the other hand, up to a content of ⅓ by mass, the presence in the isocyanate of unmasked trimers of cycloaliphatic monomers such as IPDT or nBDT have a favorable effect on the glass transition temperature (Tg) and do not in any way hinder the production of a high-quality coating; such compositions can readily be obtained by mixing the unmasked trimer in the molten masked compound.

If reference is made to the compounds which may be used as polyols for the composition according to the invention, those which make it possible most easily to obtain powder paints or powder varnishes of low sheen are hydroxylated acrylic resins and/or linear or branched, hydroxylated, saturated or unsaturated polyesters having an appropriate molecular weight and capable of being crosslinked by a reaction with an isocyanate prepolymer (that is to say an isocyanate which is at least partially masked according to the invention).

The prepolymer is provided with masked (or blocked) active functions and it is activated thermally by liberation of the blocking agent, by exchanging the isocyanate groups which react with the hydroxyl groups of the binder, in the presence or absence of catalysts.

This system makes it possible to obtain powder paints having a suitable Viscosity on melting and a glass transition temperature above 40° C., thereby entailing chemical and physical stability during storage.

The possible functionality of the carboxyl, which defines the molecular weight of the polymer, thus allows a double-crosslinking with aromatic or aliphatic epoxy resins and/or hydroxyalkylamides.

The excess of acidic groups is determined by its acid number, expressed in milligrams of potassium hydroxide required to neutralize the free acidity of one gram of polyol (occasionally referred to as "resin").

The hydroxyl number corresponds to the milligrams of potassium hydroxide required per gram of resin in order to neutralize the excess acetic acid liberated during acetylation (with acetic anhydride) of the hydroxylated polymer. For further details, reference may be made to standard ASTM-E222.

The hydroxyl number of the polymer may range between 10 and 350 mg KOH/g, preferably between 15 and 80. The acid number is at most equal to about 20 mg KOH/g, advantageously at most 15 mg KOH/g; it is also advantageously at least 2 mg KOH/g, preferably at least 4 mg KOH/g. A good choice involves using hydroxylated polymers whose acid number is preferably between 3 and 15 mg KOH/g.

The number-average molecular weight, Mn of the binder or hydroxylated polymer of the present invention ranges between 2000 and 15,000 g/mol, its degree of branching (that is to say the average number of free OH functions per molecule) is between 2 and 4. The molecular weight is determined by gel permeation chromatography (GPC). The technique uses, as gels, two polystyrene gels (Ultrastyragel® at $10^4$ and 500 Å), THF as the solvent and sulphur as the standard.

It is desirable for the degree of branching (that is to say the average number of free OH functions per molecule to be between 2 and 4, advantageously between 2.5 and 3.

The matt effect increases as the branching increases. Branching may be obtained using polyols with functionality of more than two (in general triols) or polyacids (often used in the form of anhydride in order to reduce the amount of water released during the reaction) with a functionality of more than two; the latter case is preferred for the matt effect. In particular, trimellitic acid, especially in the form of anhydride is very favorable.

In the case of the use of hydroxylated polyesters for the present invention, the product of the esterification of one or more aliphatic, aromatic or cycloaliphatic di- or polycarboxylic acids or anhydrides or their methyl esters, which contain 2 to 36 carbon atoms, is used.

For example, mention may be made of adipic acid, succinic acid, sebacic acid, suberic acid, azelaic acid, decanedicarboxylic acid, glutaric acid, terephthalic acid, isophthalic acid, phthalic acid or anhydride, naphthalenedicarboxylic acid, hexahydrophthalic acid or anhydride, 1,4-cyclohexanedicarboxylic acid, dimerized fatty acids and trimellitic anhydride.

The molecular weight of the polymer may be adjusted by adding aliphatic or aromatic monocarboxylic acids, or their methyl esters, having 2 to 18 carbon atoms.

The percentage of the acid(s) or anhydride(s) described above within the polymer mixture ranges between 20 and 70%, preferably between 30 and 60%, taken individually or mixed.

If the polymer of the present invention is unsaturated, di- or polycarboxylic acids or anhydrides unsaturated as olefins, such as maleic acid or anhydride, tetrahydrophthalic acid or anhydride, fumaric acid, hexachloroendomethylenetetrahydrophthalic acid or anhydride, methylmaleic acid, itaconic acid or derivatives of dicyclopentadiene, or of methylmaleic, itaconic, maleic or fumaric acid.

Among the polyhydroxylated alcohols which are useful for synthesizing the polyester are: ethylene glycol, 1,2- or 1,3-propylene glycol, 2-methylpropanediol, diethylene glycol, dipropylene glycol, 1,4-butanediol, 2,3-butylene glycol, 1,6-hexanediol, 1,5-pentanediol, neopentyl glycol, cyclohexanedimethanol, triethylene glycol, neopentyl glycol hydroxypivalate, tetraethylene glycol, polyethylene glycol, polypropylene glycol, dibutylene glycol or polyethylene glycols, trimethylpentanediol, butylethylpropanediol, glycerol, trimethylolpropane, hexanetriol, pentaerythritol, sorbitol, trimethylolethane and tris(2-hydroxyethyl) isocyanurate. The percentage of these may range between 10 and 60%, preferably between 10 and 50%.

For the preparation of the polyesters, and in particular during creation or conversion of the ester bond, it is indicated to use catalysts which are known "per se" for the esterification; these catalysts, which may be found in the final composition, may be used alone or as a mixture. Among the catalysts which may be used in the context of the present invention, mention should be made more particularly of those based on protic acid (especially those which are organic) or based on Lewis acid, which is advantageously organic. More specifically, among the protic organic acids, mention may be made of sulphonic acids, the most common of which are paratoluenesulphonic acid and methanesulphonic acid. Among the Lewis acids, mention should be made of those based on titanium, such as titanium tetrachloride, tetra-n-butyl titanate, isopropyl titanate, tetrakis(2-ethylhexyl) titanate, titanium acetylacetonate, stearyl titanate, nonyl titanate or cetyl titanate, those based on vanadium such as isopropyl vanadate or n-butyl vanadate, those based on zirconium such as zirconium tetrachloride, n-propyl zirconate or n-butyl zirconate, those based on tin such as anhydrous or hydrated tin chlorides, dibutyltin oxide, tin octanoate, butyltin hexanoate, tin oxalate, monobutyltin oxide, monobutylchlorotin dihydroxide, dibutyltin dilaurate, dibutyltin diacetate and monobutyltin tris(2-ethylhexanoate).

The use of the above catalysts is particularly advantageous in the case of saturated hydroxylated polyesters, and in a percentage by mass advantageously between ½ and 2% relative to the saturated hydroxylated ester.

Addition of the compounds of the above types makes it possible in particular to reduce the manufacturing time and the emission of volatile compounds, and allows optimization of the final color of these polyols which is particularly suitable for the present invention.

In the case where a methyl ester (of di- or polycarboxylic acids) is used at the start, it is very desirable to use those of the above catalysts which are known for giving satisfactory catalysis of the transesterification, or to introduce other catalysts which are known to do this, for example zinc carboxylates, antimony trioxide or any other catalyst known to those skilled in the art in the technical field of condensation. The amounts to be used are advantageously between ½ and 1% (by weight) of the initial charge.

Besides working in an inert atmosphere, in order to improve the polymer or to protect it from coloration during the esterification process, it is preferable to add antioxidant additives such as triphenyl phosphate, tris(nonylphenyl) phosphate, stearylpentaerythritol diphosphite or equivalents thereof. These compounds are preferably used in an amount at least equal to 5 per thousand and at most equal to 15 per thousand.

In order to obtain the polyester mentioned above, techniques which are known per se are used. The usual reaction conditions may be mentioned, namely:

final temperature between about 200° C. and 260° C.,
absolute pressure between 5 hectopascals and 800 kilopascals.

The acid number and the hydroxyl number should be controlled; the alkalinity is adjusted to the point where it is possible to obtain the best properties of covering of the polyurethane. Thus, before unloading, in principle in a refrigerated chamber, catalysts, antioxidants and any additive required for the final application are incorporated.

The polyesters used for the present invention have a glass transition temperature (Tg) of between 40 and 80° C., preferably between 50 and 70° C., in order to give the system the stability required during storage. It is possible to use mixtures of amorphous and crystalline polyesters, the appropriate proportions of which must allow both good chemical and good physical stability. The Tg of the polymer is determined by calorimetry by differential analysis (DSC).

In the present invention, in the case where hydroxylated acrylic polymers are used, only one binder is used, the Tg being between 40 and 100° C., or alternatively mixtures are used comprising 0 to 30% of an acrylic polymer, the Tg being between −20 and 50° C., and 70 to 100% of a hydroxylated acrylic polymer, the Tg being between 40 and 100° C. With the mixture, the system may be treated easily and have good stability during storage, as well as good chemical and mechanical properties.

The hydroxylated acrylic polymers may be obtained by reacting alpha,beta-unsaturated ethylene monomers, in particular vinylaromatic monomers and esters of alpha,beta-unsaturated ethylenecarboxylic acids. Mention may be made, for example, of styrene and its derivatives, such as methylstyrene or chlorostyrene; in the case of products for exteriors, they are present in amounts of between 5 and 54%, preferably between 10 and 25% of the monomers as a whole. Amounts less than 5% may affect the corrosion resistance.

Among the alpha,beta-unsaturated ethylene acid esters, mention may be made of acrylic and methacrylic acid esters such as methyl acrylate, ethyl acrylate, butyl acrylate, 2-ethylhexyl acrylate, dodecyl acrylate, methyl methacrylate, ethyl methacrylate, butyl methacrylate, 2-ethylhexyl methacrylate and lauryl methacrylate. Preferably, the unsaturated esters are present in an amount of between 5 and 8%, and correspond to a mixture of esters of alkyl having 1 to 3 carbon atoms and 4 to 20 carbon atoms, for example a mixture of methyl methacrylate and butyl acrylate.

The hydroxyl functionality of the acrylic polymer is imparted by the copolymerization of monomers having hydroxyl groups, such as hydroxyethyl methacrylate and acrylate, and hydroxypropyl acrylate and methacrylate, in amounts of between 5 and 80%, this percentage, which relates to the monomers as a whole, being necessary in order to obtain the hydroxyl number indicated.

The acrylic polymer may have a certain acid number, normally less than 15, derived from the addition of acrylic acid, methacrylic acid, itaconic acid or fumaric acid and/or of maleic acid or anhydride.

In order to prepare the acrylic polymers, the various monomers are mixed together and are reacted by free-radical polymerization. Among the initiators which may be used, mention may be made in particular of benzoyl peroxide, tert-butyl hydroperoxide, di-tert-butyl peroxide and azobisisobutyronitrile. Chain-transfer agents such as mercaptopropionic acid, dodecyl and lauryl mercaptan may be used to adjust the molecular weight. The polymerization is carried out in solution, using a solvent in which the monomers are soluble, such as toluene, xylene, butyl acetate and propylene glycol methyl ether acetate, inter alia. Once the polymerization is complete, the reaction mixture is evaporated, under vacuum, in order to remove the organic solvent and to recover the solid polymer. The residual content of solvents or volatile compounds should be less than 0.5%.

Admittedly, when the hydroxylated acrylic polymers are used in accordance with the conditions described above, satisfactory crosslinking with a prepolymer containing isocyanate functions masked according to the present invention is indeed obtained with the desired matt effect, but the mechanical properties remain insufficient for uses subjected to bad weather. Thus, it is preferred to use polyisocyanate and saturated polyester systems.

The acid number which the polymer of the present invention has makes it possible to react the carboxyl groups with aliphatic, aromatic and/or betahydroxyalkylamide polyepoxides, and double-crosslinking is thus obtained.

As has been mentioned previously, the esterification catalysts may be found in the final polyester and may act as a matt-effect agent. In order to improve the reproducibility of this effect and to allow the polyacrylic di- or polyalcohols to benefit therefrom, it is preferable, so as to have a good matt effect, to verify the presence of and, if necessary, to add an esterification (including transesterification) catalyst.

A binder content in the catalyst at least equal to 0.5%, advantageously to 1% and preferably to 2% should be ensured. It is preferable for the content not to exceed 5%, advantageously 3%, preferably 2% by mass. As most catalysts are based on elements of metallic nature, it may be more practical to express this characteristic in terms of atomic equivalents. In this case, it is expressed that a content at least equal to 0.003 equivalent per kg mass (of binder), advantageously 0.005, preferably 0.01 equivalent, should be achieved, and it is preferable for the content not to exceed, on a mass basis, 0.3 equivalent, advantageously 0.2 equivalent, preferably 0.1 equivalent per kg mass (of binder).

The esterification catalysts which give the best matt effect are catalysts having one, preferably both, of the following characteristics:

a low liposolubility, and preferably an advantageously solid crystalline form.

As regards the low liposolubility, it should be mentioned that these preferred catalysts are only sparingly soluble or are insoluble in the media (chlorobenzene+octanol) of the octanol test (see below).

In general, in order to satisfy these conditions, it is preferable to choose inorganic salts [having a catalytic activity] and/or organic salts (including salts derived from hydrocarbons, such as, for example, those corresponding to the "anion" $CH_3CH_2$—, although they are not the most advantageous), such as sulphonate, carboxylate, acetylacetonate, phosphate, phosphonate or phosphinate, which have few methylene or methyl units, advantageously on average not more than 3 per anion (for example the malonic dianion [—OOC—$CH_2$—COO—] has ½ methylene per anion), preferably not more than 2, more preferably not more than 1, and even zero.

As regards the solid form, it is preferable for the melting point to be above that of the mixture, particularly by extrusion.

Among the catalysts which are capable of giving very good results, mention may be made of those which are reputed to catalyze allophanation reactions; another category of catalyst which moreover largely covers that of the allophanation catalysts are catalysts for the carboxylic acid isocyanate reaction.

Among the catalysts which give particularly good results, mention should be made of tin II salts, such as pyruvate, oxalate, halide and in particular chloride (which also have the advantage of giving a so-called structured surface).

Surprisingly, the catalysts which can be used as catalysts for the masking reaction can promote the appearance of the matt effect (or of the satin effect). Thus, as catalysts which promote the matt effect, mention may also be made of organic bases in which the basic function is borne by a nitrogen or phosphorus atom, nitrogen being preferred. It is desirable for the basic atom not to bear any hydrogen. The basicity is at least equal to that of pyridine rings (for example pyridine in the strict sense, picolines and quinoline); the preferred bases are phosphines or, preferably, tertiary amines. The tertiary amines can have from three up to about 50 carbon atoms per basic function (it should be recalled that it is more practical for there to be only one per molecule), heavy amines, especially fatty amines, have a favorable effect on the appearance of a painted surface, but the effect on the matt effect is slightly weaker.

Amines also have a favorable effect on the mechanical properties, which indicates a catalysis of the crosslinking in powder phase.

It is, admittedly, preferable for the organic bases to be, per se, relatively non-volatile (b.p. at least equal to 80° C., advantageously to 100° C., preferably 200° C.), but, under the conditions for crosslinking powders, the observation of the low volatility is not a very great constraint and is easily achieved in particular provided that there are free acid functions in the binder in an amount at least equal to the amount of base (expressed in equivalents), otherwise it may be envisaged to use heavier bases, i.e., bases whose molecular mass is at least equal to 100, advantageously to 180, preferably fatty bases, i.e., bases with a molecular mass of greater than 250. The organic bases can be pure or a mixture. The amines can contain other functions and in particular functions corresponding to amino acid functions and cyclic ether functions such as N-methylmorpholine, or otherwise. These other functions are advantageously in a form which does not react with the isocyanate functions. In order to obtain an intense matt effect, it is desirable for the amount of amine to be, at least equal to about 1% (in equivalents), advantageously to 2%, preferably to 3% of the masked isocyanate functions in the powder; the amines can be used alone or in combination with the preferred metal catalysts mentioned above.

This or these catalysts which promote the matt effect may be introduced at various steps in the preparation of the powder paint, in particular during the blending before the final extrusion or during the preceding operations, in particular in the polyols after the condensation.

The use of these polyols containing at least one of the above catalysts is particularly favorable for carrying out the present invention (in order to calculate the concentrations, the above data may be used for the binder, given that the polyol represents 80% of the binder) polyols which act as a vector product for the catalyst may also be used, thus facilitating its packaging in the final mixture. In this case, the concentration by mass is higher than the values given in the above binder and may reach 25 or even 50%.

The binder of the present invention makes it possible to obtain matt (low sheen), smooth, structured, textured paints and other effects such as the shot-blasted effect, using the additives, fillers, pigments and manufacturing processes known to those familiar with the manufacture of powder coatings.

The presence of (matt-effect) waxes in the coating composition makes it possible to improve the matt effect, but this promotes the formation of microcraters, which should be avoided in certain uses of paints. Given the above, a person skilled in the art will choose whether or not to use these waxes.

These waxes, which are known per se, may be chosen from polyethylene oxides, and are added in a proportion ranging from 0 to 5% relative to the binder (by mass).

They may also be chosen from mixtures of ethylene polyoxides of the above type and fluoro-, advantageously perfluoro-hydrocarbons and, in particular, tetrafluoroethylene polymers (PTFE). In the case of fluorohydrocarbons, it is preferable not to substantially exceed 1%; they are generally used at a content of greater than 0.1% relative to the binder. The perfluorohydrocarbons are generally not used alone but as a mixture with the above polyethylene oxides.

The fillers and pigment together may reach ⅔ of the mass of the binder.

In the formulation of paints, the appropriate pigments which make it possible to obtain the desired color should be present, it being possible for these pigments to range between 1 and about 50% by weight of the total of the powder paint. Fillers may thus be used in the formulation in amounts of between 5 and 40%.

Among the pigments, special mention should be made of titanium dioxide, since this pigment may have a neutral role or may promote the matt appearance, depending on the pretreatment chosen. It was seen that titanium oxides which have undergone a silica (and possibly alumina) treatment significantly increased the matt effect, the one having the most pronounced effect being that sold under the name Titafran RL68 (now sold under the name Rhodoline RL68).

Titanium dioxides treated with zirconium oxide have little influence on the matt effect.

A person skilled in the art can thus easily modify the satin or matt nature by acting on the titanium dioxide used.

The paint or the varnishes according to the present invention may contain the various types of additives, which are known per se, such as degassing agents, levelling agents, antioxidants and UV absorbers (anti-LTV agents or anti-UV agents). They may also contain the various matt-effect adjuvants known to improve this effect.

Thus, as recommended degassing agents, mention may be made of benzoin, present in particular in an amount of between 0.5 and 3%, which makes it possible to release the volatile compounds from the film during hardening and to prevent defects such as the formation of craters or pits.

The spreading additives recommended are acrylic polymers, fluoro polymers or polymeric siloxanes, in amounts of between 0.5 and 5% added directly as a "master batch" into suitable polymers or absorbed onto silica.

In order to improve the exterior strength and the resistance to over-firing or to hardening in ovens with direct gas injection, it is recommended to add to the formulations UV-absorbing compositions and/or antioxidants of the primary and/or secondary type, of the phenolic type or alkyl/aryl phosphates. The said additives may be present in the formulation in an amount of between 0.5 and 2% of the paint as a whole.

In order to reduce the hardening (crosslinking) temperature, catalysts for formation of urethane, such as DBTDL (dibutyltin dilaurate) may be added to the formulation, directly into the premix or as a master batch.

The matt powder paints which form the subject of the present invention may advantageously be manufactured by melt-blending the compounds of the formulation. Firstly, they are preblended in a blender and are then melted, they are homogenized and are dispersed in an extruder which has one or more screws.

It is desirable for the mixing, blending and extrusion temperature to be at most equal to about 130° C., advantageously to about 110° C., preferably to 100° C. (3 significant figures). It is desirable for the extrusion temperature to be at least equal to about 60° C., advantageously to about 70° C., preferably around 80–90° C. The extruded material obtained is left to cool and is passed through a mill until a paint having the desired particle size is obtained (in general $d_{90}$ is at most equal to about 200 micrometers, advantageously 100 micrometers (two significant figures) and $d_{10}$ at least equal to about 20 micrometers, advantageously about 50 micrometers) in order to apply it to metal supports such as steel, aluminum or other alloys, glass, plastic or wood.

The ratio between the polyol(s) and the isocyanate(s) is defined by the deblocking stoichiometry. The amount of isocyanate stoichiometrically required to react with all of the free hydroxyl is generally chosen, with a tolerance of 20%, advantageously of 10%, preferably of 5%. As it is preferable to have an excess of isocyanate, slightly offset ranges are preferred. In other words, the amount of isocyanate to be added is advantageously at least equal to about 90% and at most equal to about 120% of the stoichiometric amount; preferably, it is at least equal to 95% and at most equal to about 110% of the stoichiometric amount; the most common and thus the most desirable range is at least equal to 100% (three significant figures) and at most equal to 105% of the stoichiometric amount. When systems having a high proportion of free acid (for example at least $\frac{2}{3}$ of the masked isocyanate functions, see above) are used, it may be envisaged to increase the ratio between isocyanate and hydroxyl function from 10 to 30 points (%) approximately relative to the above values.

The powder obtained may be applied with an electrostatic gun or by a fluid bed. The preferred application of the present invention is that carried out with the Corona-charge and Corona-effect electrostatic gun or by friction (triboelectric).

The substrate onto which the paint is applied, mainly steel or aluminum, may or may not be preheated before the application. Once applied, the powder is melted and hardened in an oven for 10 minutes to two hours at a temperature of between 140 and 220° C. depending on whether or not the system is catalyzed, generally for 10 to 30 minutes at a temperature ranging from 180° to 220° C.

Bearing in mind the preceding text, a person skilled in the art will adapt the firing by recalling that increasing the firing temperature makes it possible to decrease the firing time, and vice versa.

One of the advantages of the present invention lies in the fact that deep matt effects can be obtained without necessarily using compounds having at least one amide function substituted with an alkyl which itself bears an alcohol function beta to the nitrogen. These products are often sold under the name Primid® and usually correspond to the diamidation of a diacid (for example adipic acid, malonic acid, succinic acid, glutaric acid, etc. or a mixture thereof) with diethanolaminel. Admittedly, it is possible to use them, but their addition provides only a small additional matt effect. Thus, it is possible in particular to use only a small amount of them (not more than 3% by mass of the coating, advantageously not more than 2%, preferably not more than 1%) or, better still, not to add any of them at all.

Thus, according to the present invention, it is possible to obtain coatings having a very slightly alveolar structure. The alveolae are relatively few in number and represent a volume which is low enough for the mechanical properties to be adversely affected but, in the region of the surface, become transformed into craters that are invisible without magnification and induce undulations of a size (relief variation) of the same order of magnitude as the wavelengths of the visible spectrum.

More precisely, the compositions according to the present invention make it possible to obtain matt or satin coatings which advantageously have on average, over a normal section, undulations at the surface with a relief variation of from 0.2 to 5 μm (micrometers), preferably from 0.4 to 3 μm (micrometers) and in the most favorable cases from about 1 to 3 μm (micrometers).

The statistical density is advantageously from about 5 to 500 "undulations" per millimeter and preferably from about 10 to about 100 "undulations" per millimeter.

Some of these undulations may correspond and this improves the quality of the matt effect (viewed from above) to circles which resemble, under very high magnification, very flat lunar craters. The craters less than 0.2 μm (micrometer) in diameter and greater than 10 μm (micrometer) are not taken into consideration.

In general, these craters represent at the surface from $\frac{1}{20}$ to $\frac{1}{3}$ of the surface.

Half of the surface, advantageously $\frac{2}{3}$, preferably three-quarters corresponds to craters with a diameter at least equal to 1, advantageously to 2 gm (micrometer) and equal to not more than 6 μm, preferably to 5 μm (micrometer).

One of the characteristics of the compositions according to the present invention is to release, under the crosslinking conditions, a small amount of carbon dioxide which gives rise to the alveolae, craters and/or undulations and the matt effect.

The alveolae are entirely observable by electron microscope.

The present invention will be better understood with the aid of the illustrative examples which follow, in which the various exterior/interior matt paint systems are compared, in order to indicate the favorable points of the system proposed.

| OCTANOL TEST-definitions | |
|---|---|
| "liberation" (or "deblocking") temperature | this is the lowest temperature at which the masking agent of the masked isocyanate is 9/10 (mathematically rounded-up) displaced by a primary monoalcohol (the primary alcohol is generally octanol) |
| shelf life | in order to ensure a good shelf life, it is preferable to choose masked isocyanate functions whose octanol test shows a "liberation" at 80° C., advantageously at 90° C., which is at most equal to 90%. |
| reaction progress | the reaction is considered to be complete if it proceeds to more than 90%. |

Procedure

About 5 mmol of protected masked NCO equivalent to be evaluated are loaded into a Schott-type tube with magnetic stirring. 2.5 to 3 ml of 1,2-dichlorobenzene (solvent) and the equivalent of 1-octanol (5 mmol, i.e., 0.61 g, optionally with the catalyst to be tested with the masking group) are added.

The reaction medium is then brought to the test temperature. It is then heated for 6 h at the test temperature, so as to deblock the isocyanate functions and thus make them reactive. Once the reaction is complete, the solvent is removed by distillation under vacuum and the residue is analyzed by NMR, mass spectrum and infrared. From these data, the percentage of masked isocyanate function condensed with the 1-octanol is evaluated.

Products Used

The products used in the examples below are often denoted by their trade name. These products are described in technical sheets whose references will be found in the following table:

| Trade name | Marketed by | Type of chemical product | Technical sheet reference | Date published |
|---|---|---|---|---|
| PT810 | Ciba Geigy | glycidyl isocyanurate | 37236/f 750.313:15 | |
| BYK-360 P | Byk Chemie GmbH | polyacrylate adsorbed onto silica | SM 18 | June 1993 |
| Cerafluor 961 | Byk Cera | micronized polyethylene wax | XM 961 | September 1995 |
| DT 3329-1 | Ciba Geigy | wax | | April 1994 |
| XB 4957 | Ciba Geigy | matt-effect agent | Best. No. 93118 | November 1993 |
| Primid XL 552 | EMS | hydroxyalkyl-amide hardener | 7.2.1 | |
| accelerator DT 3126 | Ciba Geigy | | 38037/F 900.110/20 | January 1990 |
| Reafree 3300 | Resisa | saturated hydroxylated polyester | 3300/950119 | January 1996 |
| Reafree 7000 | Resisa | saturated hydroxylated polyester | 7000/960725 | July 1996 |
| Reafree 4001 | Resisa | saturated carboxylated polyester | 4001/960329 | March 1996 |
| Reafree 4401 | Resisa | saturated carboxylated polyester | 107370/960221 | February 1996 |
| Reafree 8580 | Resisa | saturated carboxylated polyester | 107240/930309 | March 1993 |
| Reafree 8180 | Resisa | saturated carboxylated polyester | 8180/960521 | May 1996 |

Definitions of Abbreviations and Margins of Uncertainty

*The batch used for Examples g and f of this hydroxylated polyester contained an appreciable proportion of residual esterification catalyst definitions of abbreviations and margins of uncertainty IPDT=IPDI (isophorone diisocyanate) trimer HDT=HDI (hexamethylene diisocyanate) trimer MPHB indicates that the blocking is performed with methyl para-hydroxybenzoate PHBA indicates that the blocking is performed with para-hydroxybenzoic acid The sheens are measured with an uncertainty of 5% (absolute)

EXAMPLE A

Two white pigmented weatherproof powder paint formulations using polyesters of different reactivity and of different ratio with TGIC were obtained as follows:

| Constituents | Trade name | Powder composition No. 1 | Powder composition No. 2 |
|---|---|---|---|
| | | Parts by mass (grams) | |
| 90/10 carboxylated polyester | Reafree 4001 | 540.0 | — |
| 96/4 carboxylated polyester | Reafree 4401 | — | 576.0 |
| Triglycidyl isocyanurate | Araldite PT810 (Ciba) | 60.0 | 24.0 |
| Benzoin | | 3.0 | 3.0 |
| Spreading agent | Byk 360P from Byk-Chemie | 9.0 | 9.0 |
| Titanium dioxide | RL 60 from Rhône Poulenc | 300.0 | 300.0 |

The components of each of the paints are blended in a blender and then homogenized separately and by melting in a single-screw extruder of the Bilss PCS-30 type, at a temperature between 80 and 120° C. The extruded material is left to cool and it is flaked on cooling rollers, ground and classified according to the desired shape. Once the two paints have been obtained, they are blended 1/1 in a high-speed blender. Once the homogenization has been carried out, the resulting powder of the mixture is applied electrostatically to steel or aluminium plates. They are hardened for 12 to 15 minutes at 200° C., the temperature of the substrate. Once the hardening has been carried out, the sheen (matt effect) of the samples applied is observed. The results and the properties are summarized in Table 1. The problem of the said system is that it requires the manufacture of two paints and the mixing of ground powders (dry-blend). This system has the drawback of poor reproducibility and small variations lead to variations in the degree of sheen.

EXAMPLE B

White pigmented weatherproof Primid-based paint. Dry-blend system, mixing of paints 1 and 2 as in Example A.

| Constituents | Trade name | Powder composition No. 1 | Powder composition No. 2 |
|---|---|---|---|
| | | Parts by mass (grams) | |
| 95/5 Carboxylated polyester | Reafree 8580 | 570.0 | — |
| 89/11 Carboxylated polyester | Reafree 8180 | — | 540.0 |
| Hydroxy-alkylamide crosslinking agent | Primid XL-552 (EMS-Chemie) | 30.0 | 60.0 |
| Benzoin | | 2.0 | 2.0 |
| Spreading agent | Byk 360-P | 6.0 | 6.0 |
| Titanium dioxide | RL 60 from Rhône Poulenc | 390.0 | 390.0 |

EXAMPLE C

White pigmented weatherproof TGIC-based paint. Use of a highly acidic matt-effect agent.

| Constituents | Trade name | Powder composition Parts by mass (grams) |
|---|---|---|
| 96/4 carboxylated polyester | Reafree 4401 | 540.0 |
| Triglycidyl isocyanurate | Araldite PT810 (Ciba) | 91.0 |
| Matt-effect agent | XB 4957 | 53.0 |
| Benzoin | | 2.0 |
| Spreading agent | Byk 360-P | 6.0 |
| Titanium dioxide | RL 60 from Rhône Poulenc | 328.0 |
| Accelerator | DT 3126 | 6.0 |

The paint has an excellent matt appearance and low sheen at 60° C. and 85° C., but the mechanical properties are entirely unsatisfactory.

EXAMPLE D

White pigmented weatherproof paint based on TGIC (triglycidyl isocyanurate). Use of a matt-effect wax.

| Constituents | Trade name | Powder composition Parts by mass (grams) |
|---|---|---|
| 96/4 carboxylated polyester | Reafree 4401 | 583.0 |
| Triglycidyl isocyanurate | Araldite PT810 (Ciba) | 44.0 |
| Matt-effect wax | DT 3329-1 | 52.0 |
| Benzoin | | 2.0 |
| Spreading agent | Byk 360-P | 6.0 |
| Titanium dioxide | RL 60 from Rhône Poulenc | 313.0 |
| Accelerator | DT 3126 | 6.0 |

The matt appearance obtained is unsatisfactory, although the other properties are correct.

EXAMPLE E

White pigmented weatherproof polyurethane paint based on a prepolymer of isophorone diisocyanate masked with E-caprolactam, for use on exteriors.

| Constituents | Trade name | Powder composition Parts by mass (grams) |
|---|---|---|
| Hydroxylated polyester, OH = 40–50 | Reafree 3300 | 448.2 |
| Caprolactam-masked IPDI prepolymer | Vestagon BF-1530 from Hüls | 129.8 |
| Micronized was | Cerafluor 961 from Byk-Cera | 20.0 |
| Benzoin | | 3.0 |
| Spreading agent | Byk 360-P from Byk-Chemie | 9.0 |
| Titanium dioxide | RL 60 from Rhône Poulenc | 290.0 |
| Baryta | | 100.0 |

The mechanical properties are acceptable but the matt effect remains poor.

EXAMPLE F

Matt polyurethane white powder paint for use on exteriors.

According to that indicated in the present invention, the use of a special polyester with the isocyanate prepolymer indicated makes it possible to obtain matt systems which have good mechanical properties and exterior strength.

| Constituents | Trade name | Powder composition Parts by mass (grams) |
|---|---|---|
| Hydroxylated polyester, OH = 40–50 | Reafree 7000 | 502.0 |
| Methyl para-hydroxybenzoate-masked HDI "trimeric" prepolymer | Methyl para-hydroxybenzoate-masked Tolonate ® HDT | 76.0 |
| Micronized was | Cerafluor (Byk 961°) | 20.0 |
| Benzoin | | 3.0 |
| Levelling agent | Byk 360-P | 9.0 |
| Titanium dioxide | RL 60 from Rhône Poulenc | 290.0 |
| Baryta | | 100.0 |

The mechanical properties are exceptional (but this does not emerge in the test since the conditions do not make it possible to demonstrate them, the maximum being achieved everywhere) and the matt effect is good.

EXAMPLE G

Cross-example in which the ester of Example F is used with the isocyanate of Example E.

| Constituents | Trade name | Powder composition Parts by mass (grams) |
|---|---|---|
| Hydroxylated polyester, OH = 40–50 | Reafree 7000 | 448.2 |
| Caprolactam-masked IPDI prepolymer | Vestagon BF-1530 from Hüls | 129.8 |
| Micronized was | Cerafluor 961 from Byk-Cera | 20.0 |
| Benzoin | | 3.0 |
| Spreading agent | Byk 360-P from Byk-Chemie | 9.0 |
| Titanium dioxide | RL 60 from Rhône Poulenc | 290.0 |
| Baryta | | 100.0 |

| Paint | Example A | Example B | Example C | Example D | Example E | Example F | Example G |
|---|---|---|---|---|---|---|---|
| Hardening | 12'200° C. | 15'200° C. | 12'200° C. | 12'200° C. | 15'200° C. | 15'200° C. | 15'200° C. |
| 20° sheen | 5.8 | 9.0 | 1.9 | 9.5 | 52 | 7.2 | 24 |
| 60° sheen | 26.5 | 34.3 | 4.5 | 42.9 | 71 | 29.9 | 63 |
| 85° sheen | 27.8 | 32.8 | 15.9 | 59.8 | 99 | 34.4 | 90 |
| Direct impact (cm) | 75 | 75 | 20 | 75 | 75 | 75 | 75 |
| Reverse impact | 75 | 75 | 0 | 75 | 75 | 75 | 75 |
| Adhesion | 100 | 100 | 100 | 100 | 100 | 100 | 100 |
| Folding (conical mandrel) (%) | 100 | 100 | 100 | 100 | 100 | 100 | 100 |
| Resistance to methyl ethyl ketone (butanone) (double passage) | >200 | >200 | 40 | >200 | >200 | >200 | >200 |
| Exterior strength | Excellent | Excellent | Good | Excellent | Excellent | Excellent | Excellent |

EXAMPLE H

White Paint

| MATERIALS | | | |
|---|---|---|---|
| Reafree 7000 | 454.0 | 443.0 | 453.0 |
| MPHB-masked HDT | 121.0 | | |
| HDT/IPDT (75/25) | | 132.0 | |
| MPHB/PHBA-masked HDT (80/20) | | | 122.0 |
| Tin oxalate | 3.0 | 3.0 | 3.0 |
| Cerafluor 961 | 20.0 | 20.0 | 20.0 |
| White set ABR | 100.0 | 100.0 | 100.0 |
| Benzoin | 3.0 | 3.0 | 3.0 |
| Byk 360P | 9.0 | 9.0 | 9.0 |
| TiO$_2$ (RL-68) | 290.0 | 290.0 | 290.0 |
| TOTAL | 1000.00 | 1000.00 | 1000.00 |

Characteristics of the paints after firing

| Substrate | Steel (R-36) | Steel (R-36) | Steel (R-36) |
|---|---|---|---|
| Firing (Temperature/Time) | 200° C. 20 m | 200° C. 20 m | 200° C. 20 m |
| Appearance/Layer (microns) | MAT 60 | SAT/60 | MAT/60 |
| Impact (Direct/Reverse) | 45/10 | 75/35 | 75/75 |
| Adhesion/Drawing | 100/5 | 100/9.5 | 100/>10 |
| Folding | 100 | 100 | 100 |
| MEK resistance | 105 | >200 | >200 |
| 20° sheen | 5 | 6 | 3 |
| 60° sheen | 30 | 35 | 15 |
| 85° sheen | 50 | 67 | 19 |

| Substrate | Steel (R-36) | Steel (R-36) | Steel (R-36) |
|---|---|---|---|
| Firing (Temperature/Time) | 210° C. 20 m | 210° C. 20 m | 210° C. 20 m |
| Appearance/Layer (microns) | MAT-SA 60 | SAT**/60 | MAT/60 |
| Impact (Direct/Reverse) | 75/75 | 75/75 | 75/75 |
| Adhesion/Drawing | 100/>10 | 100/>10 | 100/>10 |
| Folding | 100 | 100 | 100 |
| MEK resistance | >200 | >200 | >200 |
| 20° sheen | 5.7 | 6.3 | 2.5 |
| 60° sheen | 30 | 35 | 15 |
| 85° sheen | 55 | 70 | 20 |

**SAT = satin

EXAMPLE I

White Paint

| MATERIALS | | |
|---|---|---|
| Reafree 7000 | 452.2 | 451.5 |
| HBMT 35% PHB; 65% MPHB** | 122.8 | |
| HBMT 50% PHB; 50% MPHB | | 123.50 |
| SnC$_2$O$_4$ | 3.0 | 3.0 |
| Cerafluor 961 | 20.0 | 20.0 |
| White set ABR | 100.0 | 100.0 |
| Benzoin | 3.0 | 3.0 |
| Byk 360P | 9.0 | 9.0 |
| TiO$_2$ (RL-68) | 290.0 | 290.0 |
| TOTAL | 1000.00 | 1000.00 |

| Substrate | Steel (R-36) | Steel (R-36) |
|---|---|---|
| Firing (Temperature/Time) | 200° C. 20 m | 200° C. 20 m |
| Appearance/Layer (microns) | MA-RU 70 | MA-RU 70 |
| Impact (Direct/Reverse) | 75/75 | 75/75 |
| Adhesion/Drawing | 100/>10 | 100/>10 |
| Folding | 100 | 100 |
| MEK resistance | >200 | >200 |
| 20° sheen | 3.4 | 2.1 |
| 60° sheen | 18.7 | 7.0 |
| 85° sheen | 32.3 | 9.0 |

| Substrate | Steel (R-36) | Steel (R-36) |
|---|---|---|
| Firing (Temperature/Time) | 210° C. 20 m | 210° C. 20 m |
| Appearance/Layer (microns) | MA-RU 70 | MA-RU 70 |
| Impact (Direct/Reverse) | 75/75 | 75/75 |
| Adhesion/Drawing | 100/>10 | 100/>10 |
| Folding | 100 | 100 |
| MEK resistance | >200 | >200 |
| 20° sheen | 3.4 | 2.2 |
| 60° sheen | 18.4 | 7.9 |
| 85° sheen | 31.1 | 10.4 |

EXAMPLE J

White Paint

| MATERIALS | | | |
|---|---|---|---|
| Reafree 7000 | 450.0 | 171 | 451 |
| Tin oxalate | 4 | 1.4 | 4 |

-continued

| | | | |
|---|---|---|---|
| CaCO₃ | 20.0 | 8.0 | 20.0 |
| MPHB-masked HDT | 120.0 | | |
| MPHB-masked HDT | | 54.8 | |
| N-hydroxysuccinimide masked HDT | | | 113.0 |
| Cerafluor 961 | 20.0 | 8.0 | 20.0 |
| White set ABR | 80.0 | 36.0 | 90.0 |
| Benzoin | 3.0 | 1.2 | 3.0 |
| Byk 360P | 9.0 | 3.6 | 9.0 |
| TiO₂ (RL-68) | 290.0 | 116.0 | 290.0 |
| Millicarb (CaCO₃) | 10.0 | | |
| TOTAL | 1000.00 | 400.00 | 1000.00 |

| CHARACTERISTICS | | | |
|---|---|---|---|
| Substrate | Steel (R-36) | Steel (R-36) | Steel (R-36) |
| Firing β(Temperature/Time) | 210° C. 20 m | 200° C. 20 m | 200° C. 20 m |
| Appearance/Layer (microns) | MAT/50 | SAT/80 | SAT*/70 |
| Impact (Direct/Reverse) | 75/75 | 75/40 | 75/75 |
| Adhesion/Drawing | 100/>10 | 100/5.4 | 100/>10 |
| Folding | 100 | 0 | 100 |
| MEK Resistance | >200 | 150 | >200 |
| 20° sheen | 4 | 19 | 18 |
| 60° sheen | 23 | 50.0 | 55** |
| 85° sheen | 60 | 71 | 75 |

*yellowing
**virtually at the satin limit

EXAMPLE K

Structured Matt Black Paint

| MATERIALS | |
|---|---|
| SnCl₂ | 3 |
| Reafree 7000 | 443.0 |
| Rhodocoat x D2D (MPHB-masked HMDT) | 117.00 |
| Dolomie | 92.0 |
| White set ABR | 298.0 |
| Cerafluor 961 | 20.0 |
| Byk 360P | 9.0 |
| Benzoin | 3.0 |
| Raven 1020 (carbon black) | 15.0 |
| TOTAL | 1000.0 |

| CHARACTERISTICS | |
|---|---|
| Substrate | |
| Firing(Temperature/Time) Appearance/Layer (microns) | 200° C. 20 m |
| Impact (Direct/Reverse) | 75/75 |
| Adhesion/Drawing | 100 |
| Folding | 100 |
| MEK Resistance | 100 |
| 20° sheen | 1.2 |
| 60° sheen | 6.1 |
| 85° sheen | 9.5 |

| MATERIALS | |
|---|---|
| Reafree 7000 | 464.0 |
| Tin oxalate | 4 |
| Rhodocoat XD2D | 120.00 |
| Titafran RL-68 | 290.0 |
| White set ABR | 90.0 |
| Cerafluor 961 | 20.0 |
| Byk 360P | 9.0 |
| Benzoin | 3.0 |
| TOTAL | 1000.0 |
| Firing (Temperature/Time) | 200° C. 20 m |
| Impact (Direct/Reverse) | 75/75 |
| Adhesion/Drawing | 100 |
| Folding | 100 |
| MEK Resistance | >200 |
| 60° sheen | 17.8 |
| 85° sheen | 34.4 |

EXAMPLE M

Color Formulations

| MATERIALS | matt red paint | matt brown paint | matt black paint |
|---|---|---|---|
| Reafree 7000 | 454.0 | 453.0 | 451.0 |
| Insoluble catalyser | 2 | 2.6 | 3 |
| Rhodocoat XD2D | 117.0 | 117.0 | 117.0 |
| Dolomite | 92 | 92 | 92 |
| White set ABR | 260 | 264.7 | 290 |
| Cerafluor 961 | 20 | 20.0 | 20 |
| Byk 360P | 9 | 9.0 | 9 |
| Benzoin | 3 | 3 | 3 |
| Raven 1020 | | | 15 |
| Bayferrox 130 | 20.9 | 12 | |
| Printex V | 0.2 | 2.7 | |
| Cinquasia Violet R RT 887 D | 17.6 | | |
| Hornachrome yellow GMXH-35-SQ | | 14.2 | |
| Ti Pure R-960 | 4.2 | 9.8 | |
| TOTAL | 1000.00 | 1000.00 | 1000.00 |

| CHARACTERISTICS | | | |
|---|---|---|---|
| Substrate | | | |
| Firing (Temperature/Time) Appearance/Layer (microns) | 200° C. 20 m | 200° C. 20 m | 200° C. 20 m |
| Impact (Direct/Reverse) | 75/75 | 75/75 | 75/75 |
| Adhesion/Drawing | 100 | 100 | 100 |
| Folding | 100 | 100 | 100 |
| MEK Resistance | >200 | >200 | >200 |
| 20° sheen | 3.3 | 2.8 | 1.7 |
| 60° sheen | 19.7 | 15.4 | 11.0 |
| 85° sheen | 47.6 | 35.5 | 30.0 |

Example N

Effect of the Adjuvants for Condensation between the Masking Agents and the Isocyanate

| | |
|---|---|
| TiO$_2$ | 290.0 |
| amine/NCO | 3 mol % |

The Results are Collated in the Table below

Cooking 200° C., 10 min on Steel Plate

| Amount and type of isocyanate used | | |
|---|---|---|
| NCO | masking agent/agent bearing carboxylic function | sheen at an angle of 60° |
| HDT | triazole/aminocaproic acid (65/35) | 20 |
| HDT | triazole/pHBA (50/50) | 17 |
| HDT | triazole/pHBA (70/30) | 24 |

What is claimed is:

1. A composition useful for successive or simultaneous addition obtaining a certain coating comprising:
   an isocyanate which is at least partially masked by a masking group formed from an agent of formula (I);

$$Ar(R)_n(Y\text{-}Z)_m(OH)_p \qquad (I)$$

wherein Ar is an aromatic residue on which is grafted n substituents R, m divalent groups Y, and polar functions Z chosen from nitriles and carbonyl groups, and p hydroxyl functions, wherein the sum of n+m+p is at most equal to the number of substitutable chain members, the isocyanate having a degree of liberation (with respect to the masking agent) at 120° C. of not more than 5%
   and wherein a carboxylic function in free form is present on the masking agent;
   a polyol having the following characteristics:
      a glass transition temperature which is at least equal to about 40° C.;
      a hydroxyl number at least equal to about 10 mg/g;
      an average molecular mass Mn at least equal to about 1000 g/mol; and
      an organic base in which the basic function is borne by a nitrogen or phosphorous atom, wherein the basic atom does not bear any hydrogen.

2. The composition according to claim 1, wherein the isocyanate is masked by a masking group bearing at least one ester function.

3. The composition according to claim 1, in which the isocyanate is masked by an agent bearing at least one acid function masking group.

4. The composition according to claim 1, in which two different masking agents are used.

5. The composition according to claim 4, in which the masking agent comprises methyl p-hydroxybenzoate and p-hydroxybenzoic acid.

6. The composition according to claim 1, wherein, after mixing, the composition is in powder form.

7. The composition according to claim 1, which further contains titanium dioxide.

8. The composition according to claim 1, which further contains a catalyst having at least one of the following characteristics:
   low liposolubility,
   advantageously a solid crystalline form.

9. The composition according to claim 1, which has a particle size, defined by a $d_{90}$, which is at most equal to about 200 micrometers, and a $d_{10}$, which is at least equal to about 20 micrometers.

10. A process for preparing a composition according to claim 1, comprising a step in which the compounds of the formulation are preblended in a blender, after which the polyol and other meltable components are melted, homogenized and dispersed in an extruder which has one or more screws.

11. The process according to claim 10, wherein the blending and extrusion temperature are at most equal to about 130° C.

12. The process according to claim 10, which further includes a cooling step followed by a grinding step in order to obtain a particle size, defined by a $d_{90}$, which is at most equal to about 200 micrometers, and a $d_{10}$ at least equal to about 20 micrometers.

13. A paint composition comprising the composition according to claim 1.

* * * * *